J. WHITE.
BUTCHERING MACHINE.
APPLICATION FILED NOV. 20, 1920.
1,386,824.
Patented Aug. 9, 1921.
3 SHEETS—SHEET 3.
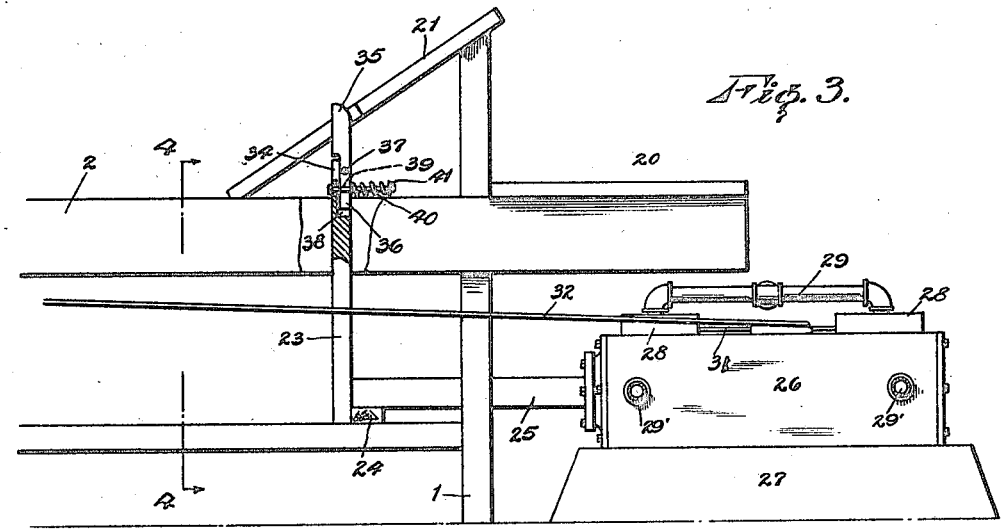
Inventor
Joseph White.
By
Lacey & Lacey, Attorneys

UNITED STATES PATENT OFFICE.

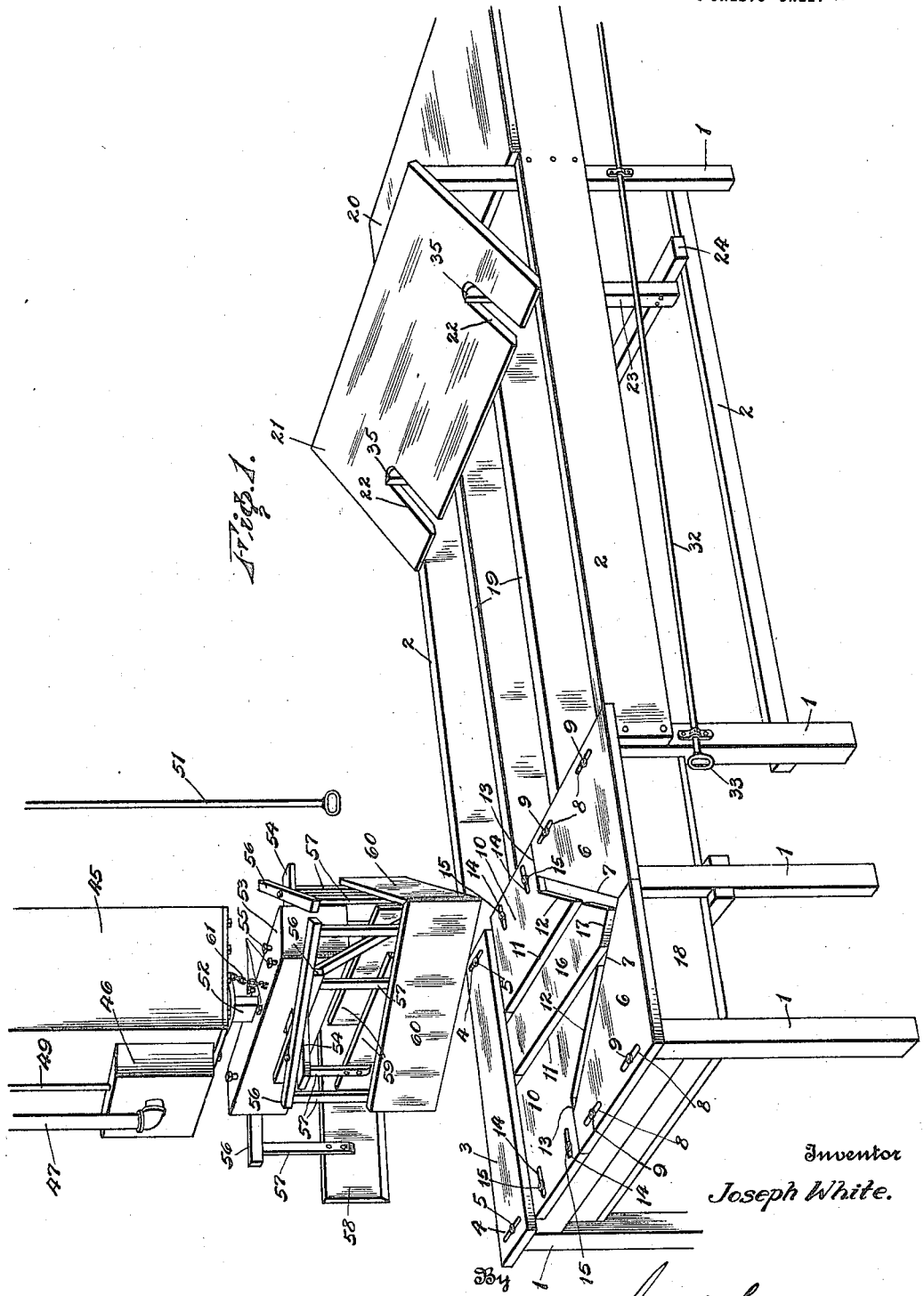

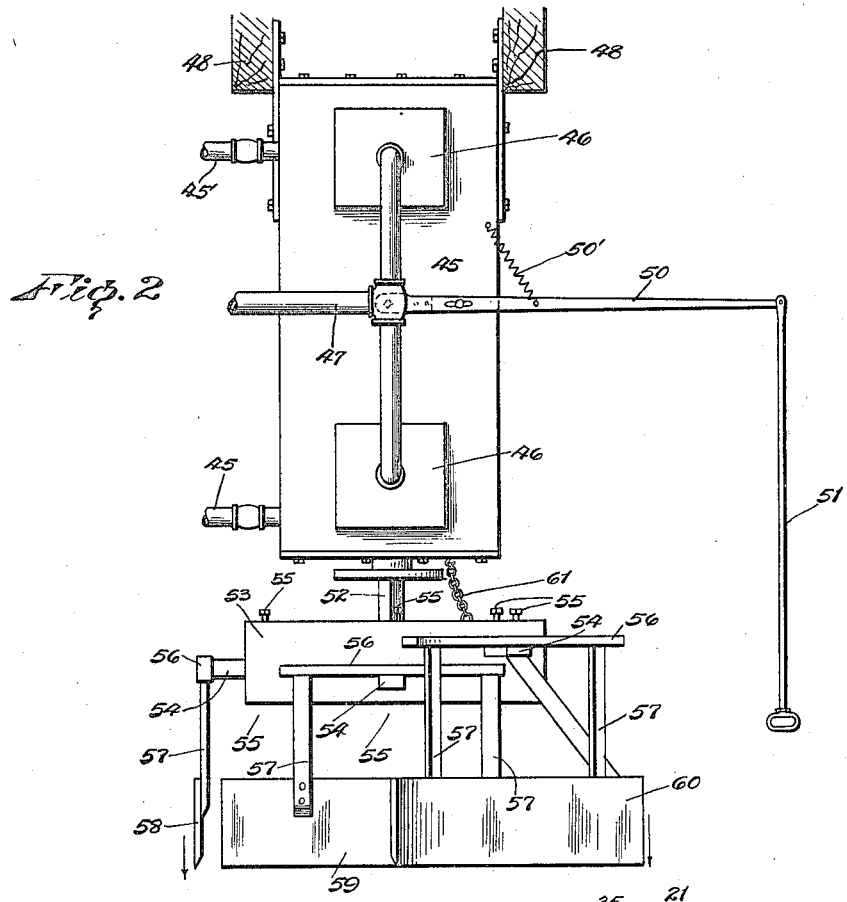
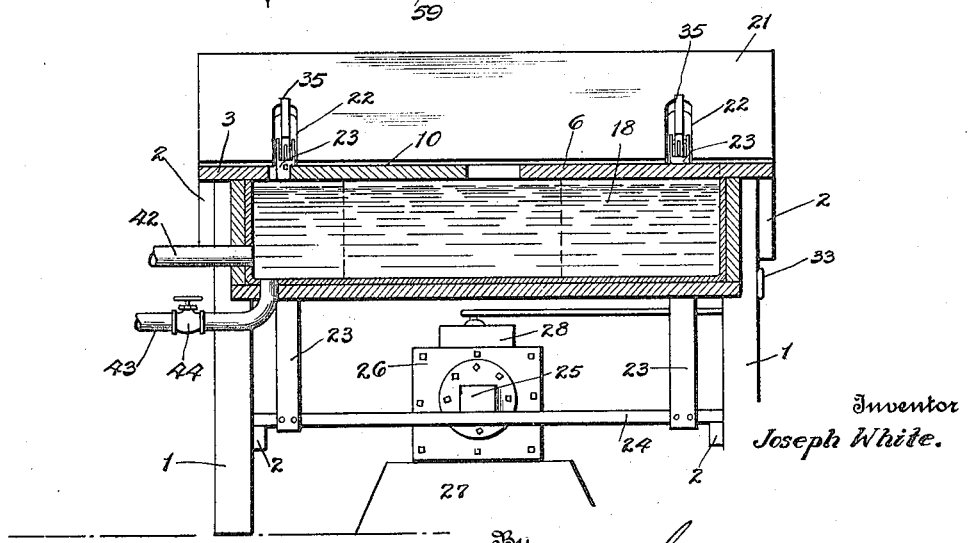

JOSEPH WHITE, OF ST. LOUIS, MISSOURI.

BUTCHERING-MACHINE.

1,386,824.  Specification of Letters Patent.  Patented Aug. 9, 1921.

Application filed November 20, 1920. Serial No. 425,504.

*To all whom it may concern:*

Be it known that I, JOSEPH WHITE, a citizen of the United States, residing in the city of St. Louis and State of Missouri, have invented certain new and useful Improvements in Butchering-Machines, of which the following is a specification.

This invention has for its object the provision of a machine whereby the handling of carcasses and the cutting of them into hams, loins, shoulders, or other sections will be facilitated. The invention seeks to provide apparatus whereby the manual labor incident to the bringing of the carcass into position to be cut will be minimized and the desired cuts made positively and with certainty. Other incidental objects of the invention will appear as the description of the same proceeds and the invention resides in certain novel features which will be particularly set forth in the appended claims.

In the accompanying drawings—

Figure 1 is a perspective view of an apparatus embodying my improvements;

Fig. 2 is an end elevation with parts in transverse section;

Fig. 3 is a side elevation of a portion of the feeding end of the apparatus;

Fig. 4 is a transverse section on the line 4—4 of Fig. 3;

Fig. 5 is a detail plan view of the knives.

In carrying out my invention, I employ a supporting frame which may be of any convenient construction and is illustrated as comprising a plurality of legs 1 and beams 2 secured to said legs, the upper longitudinal beams 2 constituting skids or tracks over which the carcass may be fed to the cutting table, as will presently more particularly appear. One end of the frame is covered by a series of plates upon which the carcass is supported while being cut. One of these plates, indicated by the reference numeral 3, is disposed longitudinally of the frame at one side of the same and is adjustable transversely of the frame by means of slots 4 formed in the plate and through which bolts 5 are inserted to secure the plate upon the frame. At the opposite side of the frame, there are two plates 6 which have their inner edges 7 disposed obliquely and converging toward the adjacent side of the frame. These plates are likewise adjustable transversely of the frame by reason of slots 8 and bolts 9 inserted through the slots into the frame. Between the plates 6 and the plate 3 are intermediate plates 10 which have straight outer edges disposed parallel with the inner edge of the plate 3 and also have straight transverse edges 11 disposed at a right angle to the first-mentioned edges and spaced from each other. Extending divergently from the inner ends of the transverse edges 11 of these plates are inclined or obliquely disposed edges 12 which are parallel with the edges 7 of the plates 6 and from the rear ends of these obliquely disposed edges 12 longitudinal straight edges 13 extend, as shown, the said edges 13 being adapted to abut the inner terminals of the plates 6. The plates 10 are adjustable longitudinally of the frame by reason of the longitudinal slots 14 in the plates and fastening bolts 15 inserted through said slots into the frame. The transverse edges 11 of the plates 10 are parallel with the front and rear edges of a stationary plate or block 16 having one end edge parallel with the inner edge of the plate 3 and its opposite end tapered, as shown at 17, so as to conform to the obliquely disposed edges 7 and 12. This member 16 may conveniently be a block rising from the bottom of a tank 18 supported upon the frame in any convenient manner for a purpose to be presently set forth.

The upper beams 2, to which reference has previously been made, are preferably disposed so that their forward ends will be under the outer portions of the plates 3 and 6, respectively as will be readily understood upon reference to Fig. 1. Between the outer beams 2, similar beams or rails 19 are provided and are secured rigidly upon the frame in any desired or convenient manner. The rear ends of the beams or rails 2 and 19 extend beyond the supporting legs 1 and upon the said extended ends I secure a platform 20 upon which a workman may stand. By referring more particularly to Fig. 1, it will be noted that the supporting legs 1 project above the beams or rails 2 at the forward edge of the platform 20 and an inclined table or feeding board 21 is supported upon the rails and the upper ends of the legs and fixed thereto in any convenient or preferred manner. The lower edge of the inclined feeding table is provided with open-ended slots or notches 22 and the upper ends of pushers 23 project into and play through the said slots. The lower ends of the pushers 23 are secured rigidly to a cross bar 24 which is slidably supported upon the lower beams or rails 2 and is secured rigidly at its center to a piston rod 25 extending from a cylinder 26 and connected to a piston mounted within the said cylinder. The cylinder 26 may be of any well-known type and is supported rigidly upon a bed plate 27 of any desired form. Upon the cylinder 26 are steam chests 28 to which steam is supplied through a feed pipe 29. Within the steam chests 28 are mounted slide valves of any well-known type and connected by a coupling rod 31. To the said coupling rod 31, a controlling rod 32 is connected and the said rod is slidably supported upon the frame, as shown clearly in Fig. 1, being provided with any suitable form of handle 33 at its free end so that it may be easily and comfortably grasped by the operator. The steam chests 28 and the slide valves mounted therein are of any well-known or preferred type and control the direction of travel of the piston within the cylinder 26 in the ordinary manner of a steam engine, being shifted, however, by the operator through manipulation of the rod 32 and the coupling rod 31 instead of being automatically shifted by devices connected with the piston rod. Exhausts for the spent steam are indicated at 29'. The upper ends of the pushers 23 are bifurcated, as shown at 34, and within the bifurcations I pivotally mount fingers 35, the lower ends of the said fingers, as shown at 36, being extended below the pivots 37 and adapted to bear against the vertical wall of a recess 38 in the pusher so that the finger 35 cannot swing rearwardly with respect to the pusher but may swing forwardly. A bolt or headed pin 39 is secured in the upper end of the pusher and projects rearwardly therefrom through a longitudinal slot in the lower portion of the finger and a spring 40 is coiled around the said pin or bolt between the finger and an abutment 41 on the pin or bolt so as to yieldably hold the finger in its upright position, as will be readily understood on reference to Fig. 3. The carcass which is to be divided is to be placed upon the inclined feeding table 21 in advance of the finger 35 and the pushers so that when the steam has been properly admitted to the cylinder 26 the piston rod 25 will move forward and thereby cause the pushers to slide the carcass along the rails 2 and 19 onto the plates 3, 6 and 10 in position to be cut. Should it so happen that the return of the pushers is not properly timed or a carcass be hurriedly placed upon the feed table 21 in rear of the pushers, the fingers 35 will yield to the weight of the carcass and permit it to slide down the feed table and assume a position in front of the pushers, the springs returning the fingers to their upright positions as soon as the carcass has cleared the ends of the fingers.

The plates 6, 10 and 3 will be set in recesses cut in the upper edges of the rails 2 and 19 so that the surfaces of these parts will be flush and the carcass will be disposed transversely with respect to the table so that the knives, to be presently described, may at one stroke cut through and sever the hams, the loins and the shoulders, the carcass being adjusted by attendants so that the lines upon which it is to be cut will correspond with the spaces between opposed edges of adjacent plates, as will be readily understood, and the several plates may be independently adjusted so as to attain accuracy in the cuts and also to vary the cuts as may be desired.

The vat 18 which has been mentioned is supported below the several plates 3, 6 and 10 and is intended to contain a plentiful supply of hot water into which the knives are plunged at each operation so that they will be kept sterilized and in proper condition for satisfactory work. The hot water may be supplied in any convenient manner and I have indicated a pipe 42 leading from a boiler into the vat and have also indicated a drain pipe 43 supplied with a cut-off valve 44 so that the water may be drawn off when desired. Of course, if it be preferred, the valve 44 may be kept normally open and the pipe 43 led back to the boiler so that a constant circulation of the hot water will be effected. Provision, however, should be made for a complete draining of the vat and a renewing of the water supply at intervals in order that the water may not become tainted and thereby defeat the purpose for which it is provided.

Disposed vertically above the carcass-supporting plates is a cylinder 45 which corresponds in every respect to the cylinder 26 and is equipped with steam chests 46 upon one side to which steam is supplied through a feed pipe 47, as will be readily understood. This steam cylinder 45 may be supported from the beams 48 of the room in which the apparatus is set up or may be supported in any other convenient manner. A coupling rod 49 connects the slide valves in the steam chests 46 and is manipulated by a lever 50 fulcrumed upon the side of the cylinder 45 and having a depending handle member 51, as clearly shown and as will be readily understood. The piston in the cylinder 45 is normally supported in its upper position by live steam admitted to the lower end of the cylinder and, when a carcass is to be severed, the lever 50 is shifted and the valves thereby set so that the steam may exhaust from the lower end of the cylinder 45 and will be simultaneously admitted to the upper end thereof so that the piston will be lowered and the piston rod 52 extending through the lower end of the cylinder will carry the head block 53 downwardly. A spring 50' secured to the lever and the cylinder holds the lever normally in its upper position. Exhausts are indicated at 45' and it is to be understood that the showing of the cylinders 26 and 45 is conventional only and that these elements and their supplementary parts may be of any preferred construction. The head block 53 is provided with recesses or passages therethrough in horizontal planes to receive the ends or portions of carrying arms 54 from which the several knives are suspended, set screws 55 being mounted in the head block to bear upon the carrying arms 54 and secure them in set positions. To the outer end of each carrying arm 54, I rigidly secure a hanger consisting of a cross head 56 and arms or links 57 depending therefrom near the ends thereof. The links are rigidly secured to the cross heads and to the lower ends of each pair of links is rigidly secured a knife. As shown most clearly in Fig. 5, there are five of these knives, the knife 58 being disposed longitudinally of the apparatus and arranged to pass through the space between the plate 3 and the adjacent plates 10 so as to sever the shoulders from the carcass. At each side of the head block 53 is a knife 59 which is arranged parallel with the side of the head block and these knives 59 will cut the loins. The knife 58, it will be readily noted, is disposed at one end of the head block 53 and at the opposite end of the said head block are knives 60 which are arranged to overlap the knives 59, and converge therefrom beyond the end of the head block, these knives being designed to sever the hams and the converging ends of these knives 60 should meet, as clearly shown. Obviously, the weight of the head block together with the knives carried thereby and the piston to which it is attached will tend to cause a lowering of the knives, and to avoid injury to the operators by accidental dropping of the knives, I maintain a constant supply of live steam in the lower end of the cylinder 45 and permit the supply to exhaust only when it is desired to have the knives descend through a carcass. If it should be necessary to adjust the knives or to sharpen the same, a restraining device such as a chain 61 may be employed to prevent the head block moving away from the cylinder and this chain or its equivalent will be brought into use whenever the steam is cutoff. The chain may be carried by either the cylinder or the head block and provided at one end with a hook to engage a suitable eye on the other member.

The construction and arrangement of the several parts of the apparatus having been thus made known, it is thought the operation will be readily understood. Live steam is fed from a steam boiler to the cylinders 26 and 45 as will be readily understood and the same heating plant may be utilized to maintain a supply of hot water in the tank 18. The carcass which is to be divided is placed in position in front of the pushers 23 and steam is then admitted to the cylinder 26 back of the piston therein so that the piston will move forwardly and act through the piston rod 25 upon the cross bar 24 and the pushers to force the carcass over the several rails 2 and 19 onto the several plates 3, 6 and 10. After the carcass has been properly adjusted by attendants at this end of the structure, the directing operator shifts the rod 32 so as to reverse the movement of the piston in the cylinder 26 and thereby effect return of the pushers. The operator also shifts the lever 50 so that the live steam in the lower end of the cylinder 45 may exhaust and steam will be admitted to the upper end of said cylinder to positively drive the piston therein downwardly and thereby carry the several knives forcibly through the carcass and into the hot water in the vat 18. After the knives have passed entirely through the carcass and into the vat, as stated, the lever 50 is reversed so that live steam will be again admitted to the lower end of the cylinder 45 and the knives thereupon raised to their initial position. In the meanwhile, another carcass will have been placed in position to be fed under the knives so that as soon as the parts of the dismembered carcass have been removed the controlling rod 32 may be again shifted to effect a feeding of the second carcass into position below the knives. The operation may thus be repeated until the entire supply of carcasses has been cut into the desired portions, as will be readily understood. The apparatus is very simple and may be operated rapidly so that a supply of carcasses will be dismembered in a short time while the manual labor connected therewith will obviously be minimized.

Having thus described the invention, what is claimed as new is:

1. In an apparatus for the purpose set forth, the combination of a plurality of supporting plates having their edges in spaced relation, a hot water vat disposed below said plates, means for feeding a carcass onto said plates, a plurality of knives disposed above the plates, and means for driving said knives through the carcass and through the spaces between said plates into the vat.

2. In an apparatus for the purpose set forth, the combination of a head block, means for raising and lowering said head block, a plurality of carrying arms adjustably secured in said head block, hangers secured to said arms, and a knife secured rigidly to each of said hangers.

3. In an apparatus for the puropose set forth, the combination of a supporting frame, a head block supported above said frame and movable vertically, a knife supported at one end of said head block and disposed longitudinally of the supporting frame, other knives disposed at the sides of said head block and parallel with the said sides and disposed transversely of the supporting frame, and other knives supported by the end of the head block remote from the first-mentioned knife and arranged at the outer sides of the transverse parallel knives and converging beyond the end of the head block and the ends of said parallel knives.

4. In an apparatus for the purpose set forth, the combination of a carcass support, a plurality of knives disposed above the said carcass support, means for forcing said knives through a carcass upon the support, a feeding table disposed at one side of said support, pushers adapted to engage against a carcass on the feeding table, and means for actuating said pushers whereby to force the carcass from the feeding table onto the said carcass support.

5. In an apparatus for the purpose set forth, the combination of a carcass support, means for dividing a carcass upon the said support, rails extending from the said support, an inclined feeding table supported upon the outer ends of said rails, pushers supported below said feeding table and extending through the same, and means for moving said pushers longitudinally of the rails whereby to engage against a carcass on the feeding table and force the same over the rails and onto the said carcass support.

6. In an apparatus for the purpose set forth, the combination of vertically disposed pushers, fingers pivotally mounted upon the upper ends of the pushers, means for preventing movement of the fingers in one direction, and yieldable means normally holding the fingers in upright position.

In testimony whereof I affix my signature.

JOSEPH WHITE. [L. S.]